(12) United States Patent
Townsend et al.

(10) Patent No.: US 7,433,798 B2
(45) Date of Patent: Oct. 7, 2008

(54) SOLID STATE ORIENTATION SENSOR WITH 360 DEGREE MEASUREMENT CAPABILITY

(75) Inventors: Christopher P. Townsend, Shelburne, VT (US); Steven W. Arms, Williston, VT (US)

(73) Assignee: MicroStrain, Inc., Williston, VT (US)

( * ) Notice: Subject to any disclaimer, the term of this patent is extended or adjusted under 35 U.S.C. 154(b) by 31 days.

(21) Appl. No.: 11/492,442

(22) Filed: Jul. 25, 2006

(65) Prior Publication Data

US 2006/0265178 A1 Nov. 23, 2006

Related U.S. Application Data

(62) Division of application No. 10/447,384, filed on May 29, 2003, now Pat. No. 7,143,004, which is a division of application No. 09/457,493, filed on Dec. 8, 1999, now abandoned.

(60) Provisional application No. 60/111,523, filed on Dec. 9, 1998.

(51) Int. Cl.
*G01C 9/00* (2006.01)

(52) U.S. Cl. .................. 702/153; 702/92; 702/95; 702/150

(58) Field of Classification Search ............ 702/153, 702/92, 95, 150
See application file for complete search history.

(56) References Cited

U.S. PATENT DOCUMENTS 5,930,741 A * 7/1999 Kramer ............... 702/153
5,953,683 A * 9/1999 Hansen et al. ........... 702/95

OTHER PUBLICATIONS

Horowitz and Hill, The Art of Electronice, Cambridge University Press, 1989, p. 665, 677.*
Sears, Zemansky and Young, University Physics, 1987, page 14.*

* cited by examiner

*Primary Examiner*—Bryan Bui
*Assistant Examiner*—Stephen J Cherry
(74) *Attorney, Agent, or Firm*—Thomas N. Neiman; James Marc Leas

(57) ABSTRACT

A solid state inclinometer sensor system includes a digital network of devices. Each device of the network includes a solid state inclinometer attached to a mounting structure. The inclinometer includes gravity sensors and a processor. The gravity sensors are mounted to provide components of earth's gravity. The processor uses data derived from the gravity sensors to calculate inclination of the mounting structure and provide a digital output for transmission on the digital network.

45 Claims, 4 Drawing Sheets

SOLID STATE ORIENTATION SENSOR WITH 360 DEGREE MEASUREMENT CAPABILITY

This application is a divisional of U.S. application Ser. No. 10,447,384, filed May 29, 2003 now U.S. Pat. No. 7,143,004, which was a divisional of U.S. application Ser. No. 09/457,493, filed Dec. 8, 1999, now abandoned, which claims the benefit of U.S. Provisional Application No. 60/111,523, filed on Dec. 9, 1998.

BACKGROUND

This invention relates to measurement devices and, in particular, to a solid state orientation sensor having a three hundred and sixty degree measurement capability for use in structural and biomedical applications.

Miniature orientation devices are used for a variety of structural and biomedical applications, including: measurement of structural angular displacement and orientation, computer input and pointing, virtual reality head and body tracking, camera stabilization, vehicle navigation, down hole drilling, feedback for functional electrical stimulation, and body position and inclination tracking. Sourced trackers use fixed magnetic field coils as a reference for magnetic sensors to detect position. (Raab et al., 1979) The source magnetic field coil is required to be relatively close (<10 feet) to the measurement coils. This greatly limit's these devices suitability in smart structure applications as it is often not practical to locate a source coil within this limited range. Sourceless trackers utilize earth's gravitational and magnetic field vectors, and do not limit a user's range of operation in any way.

This invention describes miniature, sourceless orientations sensor based on accelerometers and magnetometers that include analog and digital signal conditioning, embedded microprocessor, digital and analog output, and has the capability to measure pitch over a range of 360 degrees, yaw over a range of 360 degrees, and roll over a range of up to +/−90 degrees. Pitch, roll and yaw angles are computed in real time by a microprocessor located on the same board as the sensors, eliminating the need for bulky external processing units and facilitating networking.

The following prior art is known to the applicant:

U.S. Pat. No. 5,953,683 to Hansen et. al describes a number of devices that utilize linear accelerometers, magnetometers, and rate sensors to measure pitch roll and yaw. Their device, based only on accelerometers and magnetometers, does not teach how to use the accelerometers to have a range of greater than +/−90 degrees on elevation or roll angles. Furthermore, the Hansen device does not utilize rate responsive adaptive filters. The Hansen device also requires an initial calibration to determine the earth's magnetic field intensity. The device of the present patent application does not require this initial calibration because it uses magnetometers along three axes, and earth's total magnetic field intensity can be calculated from the three magnetometers.

U.S. Pat. No. 5,373,857 to Travers et. al describes a sourceless tracker that utilizes an optical fluid based tilt sensor. This system has the disadvantage of being fluid based which leads to an undesirable settling time and cannot measure inclination angles that are greater than +/−70 degrees.

SUMMARY

One aspect of the present patent application is a solid state orientation sensor with 360 degree measurement capability, for use in a number of different structural and medical applications. Included in this aspect are a plurality of magnetic field measurement sensors, a plurality of response accelerometers, and a microprocessor for scaling data from the sensors with calibration coefficients and for quadrant checking for calculating the absolute angle from the accelerometers.

Another aspect of this application is a solid state inclinometer sensor system, comprising a digital network of devices. Each device of the network includes a solid state inclinometer attached to a mounting structure. The inclinometer includes gravity sensors and a processor. The gravity sensors are mounted to provide components of earth's gravity. The processor uses data derived from the gravity sensors to calculate inclination of the mounting structure and provide a digital output for transmission on the digital network.

BRIEF DESCRIPTION OF THE DRAWINGS

The foregoing will become more apparent with reference to the following description taken in conjunction with the figures, in which.

DETAILED DESCRIPTION

The present patent application provides a solid state orientation sensor with 360 degree measurement capability. This solid state orientation sensor uses three orthogonal accelerometers and three orthogonal magnetometers to measure Earth's gravitational and magnetic field vectors, from which pitch, roll, and yaw (heading) are calculated in real-time. Accelerometers provide a faster response than other sensors that are used in sourceless trackers, including electrolytic fluid (Durlack et al.,1995), thermal tilt sensors, and pendulum based inclinometers. By implementing filter algorithms that are programmable by the end user, the 3DM device response can be tuned to fit a particular application.

Analog low pass filters are implemented to help minimize effects due to inertial inputs to the accelerometers. These analog filters dampen the effect of other inputs that have a dynamic response.

To supplement analog filtering an infinite impulse response (IIR) low pass recursive digital filter is utilized. The digital low pass filter function is described by the following equation:

$$x(n)=K*u(n)+(1-K)*x(n-1)$$

Figure 2:
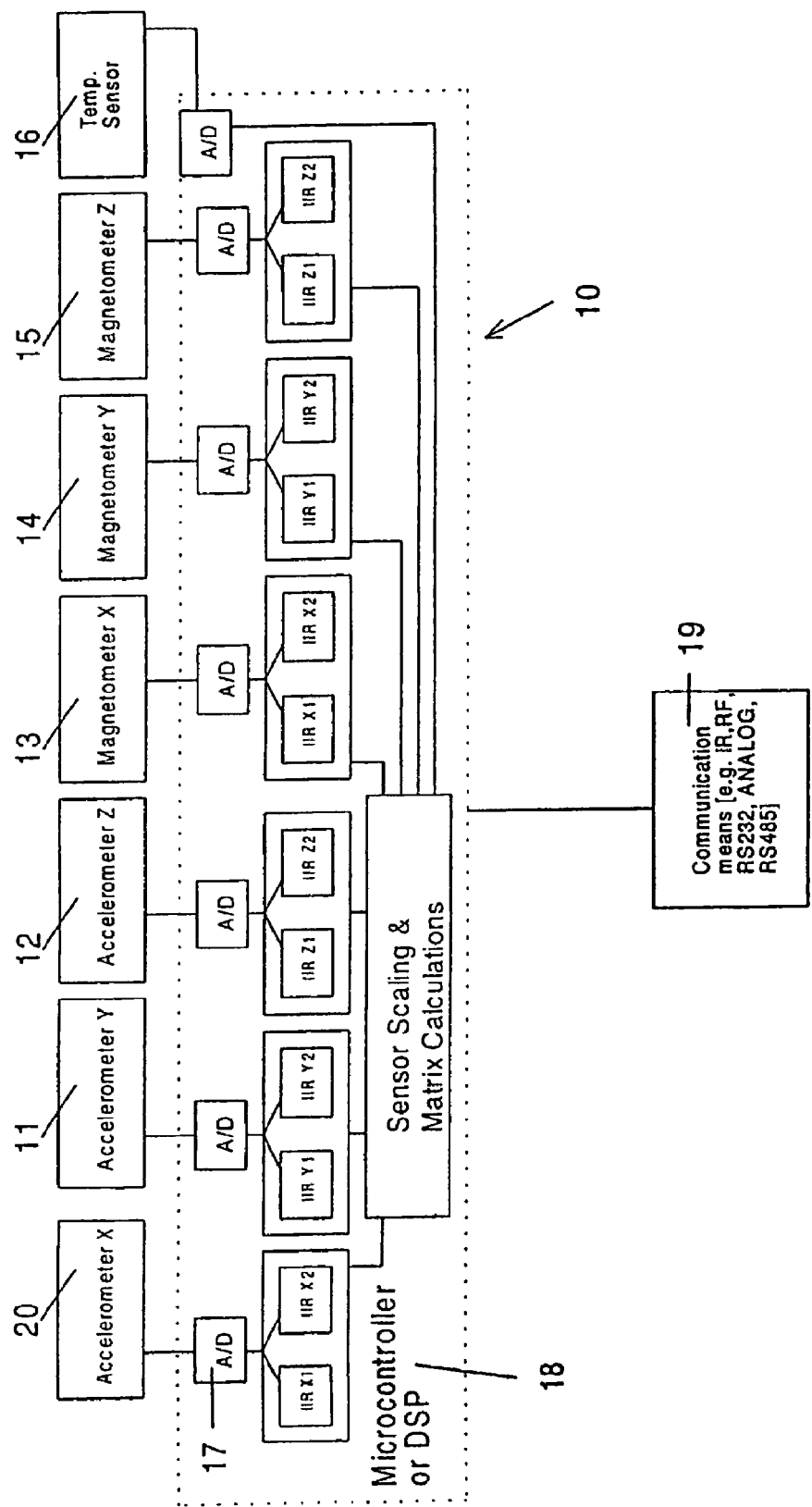
FIG. 2 is a block diagram of the operation of the orientation sensor.

The transfer function of this filter in the digital domain using the z-transform relation can be reduced to:

$$H(z) = \frac{K}{(1-(1-K)z^{-1})}$$

Where K is the filter gain, which for computational reasons in this application is always a factor of a power of two. The filter gain parameters are proportional to the filter cutoff frequency and are programmable from the PC by the user. Typically, use of a filter with a lower cutoff frequency will produce a measurement with fewer artifacts due to noise. The tradeoff is that there is a sacrifice in the system's dynamic response to achieve this lower noise measurement. To try to reach a balance between static vs. dynamic response an adaptive low pass filter is implemented that can be programmed on or off by the user. The adaptive filter works by continually calculating low pass filter readings with separate filter cutoffs on all the sensors in parallel, as shown in FIG. 2. The software monitors the first derivative of output data from the magnetometers to determine which filter coefficients to apply to the output data. The ramifications are that when the device is in a relatively static condition (or moving slowly) a more aggressive filter (a low pass filter with a lower cutoff frequency) is applied to the data because the first derivative of the magnetometer data is small. This results in a lower noise measurement. When the first derivative of the magnetometer is above a preset (programmable by the user) level the system reverts to a filter that has a faster response (a low pass filter with a higher cutoff frequency). This adaptive filtering is useful for applications such as posture control, when a stable static measurement is important, while retaining the ability to make dynamic measurements if required.

After the sensors have been filtered, pitch and roll are calculated from the accelerometers using the following relationships.

$$a_x = (a_{xraw} - a_{xoffset}) * a_{xgain}$$
$$a_y = (a_{yraw} - a_{yoffset}) * a_{ygain}$$
$$a_z = (a_{zraw} - a_{zoffset}) * a_{zgain}$$
$$\text{Pitch} = \arctan\frac{a_x}{a_z}$$
$$\text{Roll} = \arctan\frac{a_y}{\sqrt{a_x^2 + a_z^2}}$$

The pitch angle can be resolved over 360 degrees by checking the signs of $a_x$ and $a_z$ relative to each other and making an adjustment to the output based on the quadrant that the data is located in. After pitch and roll have been calculated the component of earth's magnetic field in the earth referenced horizontal plain must be calculated. First, the magnetic sensors are offset adjusted and scaled by coefficients that are determined from a calibration procedure.

$$m_x = (m_{xraw} - m_{xoffset}) * m_{xgain} \quad m_y = (m_{yraw} - m_{yoffset}) * m_{ygain}$$
$$m_z = (m_{zraw} - m_{zoffset}) * m_{zgain}$$

To project the sensor readings onto the horizontal (earth referenced) plane, the following relationships are utilized:

| | |
|---|---|
| $m_y' = m_y'' \cos(\text{roll}) + m_z'' \sin(\text{roll})$ | Roll transformation of Y axis MR |
| $m_y = m_y'$ | Since $m_y$ is coupled to roll only |
| $m_z' = m_z'' \cos(\text{roll}) + m_y'' \sin(\text{roll})$ | Roll transformation of Z axis MR |
| $m_x' = m_x''$ | Since $m_x$ is coupled to pitch only |
| $m_x = m_x' \cos(\text{pitch}) - m_z' \sin(\text{pitch})$ | Pitch transformation of X axis MR |

Once this has been completed Yaw (compass heading) can be calculated from the following relationship:

$$\text{Yaw} = \arctan\frac{m_x}{m_y}$$

A quadrant check based upon the sign of $m_x$ and $m_y$ will provide a measurement over 360 degrees of measurement range.

Figure 3:
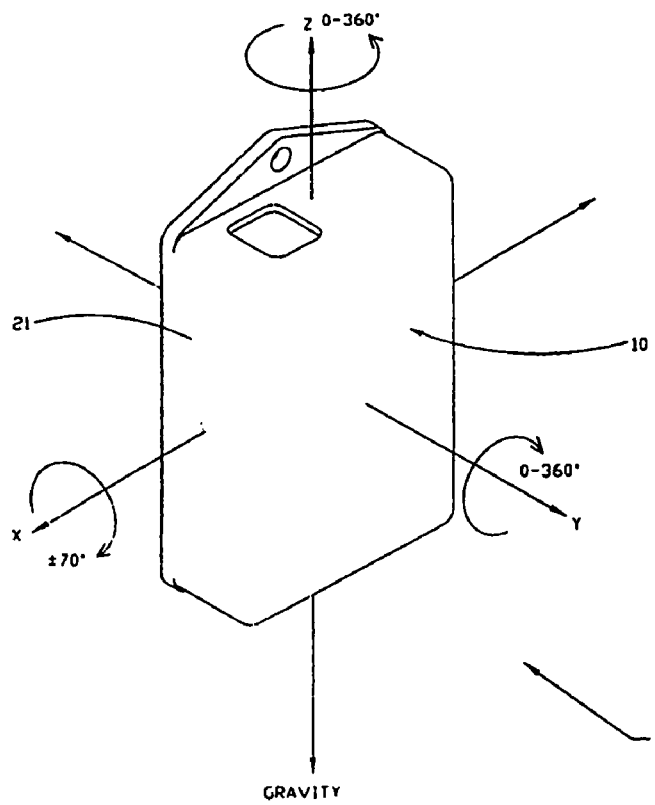
FIG. 3 is a perspective view showing the operational ranges of the solid state orientation sensor.
Figure 4:
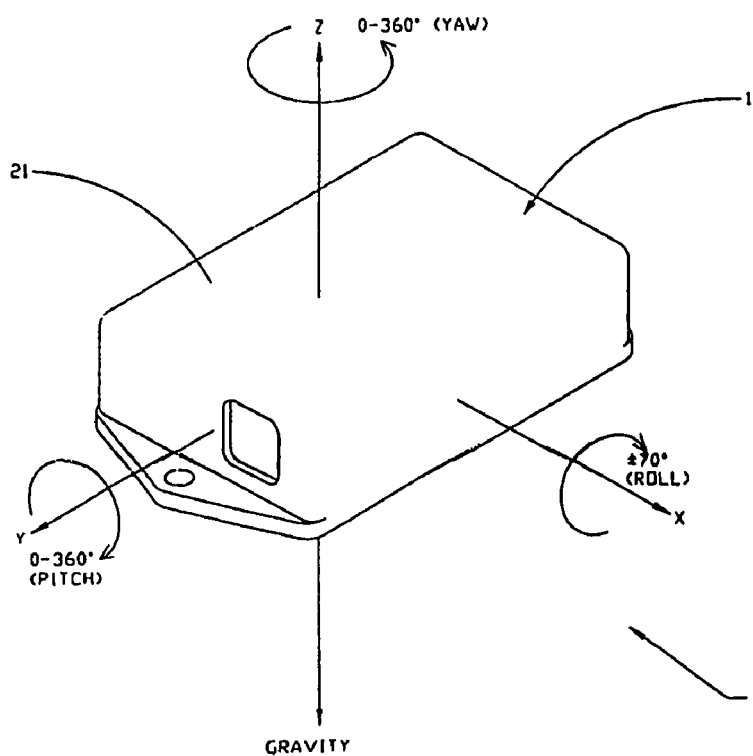
FIG. 4 is a perspective view showing the operational ranges of the solid state orientation sensor.
Figure 5:
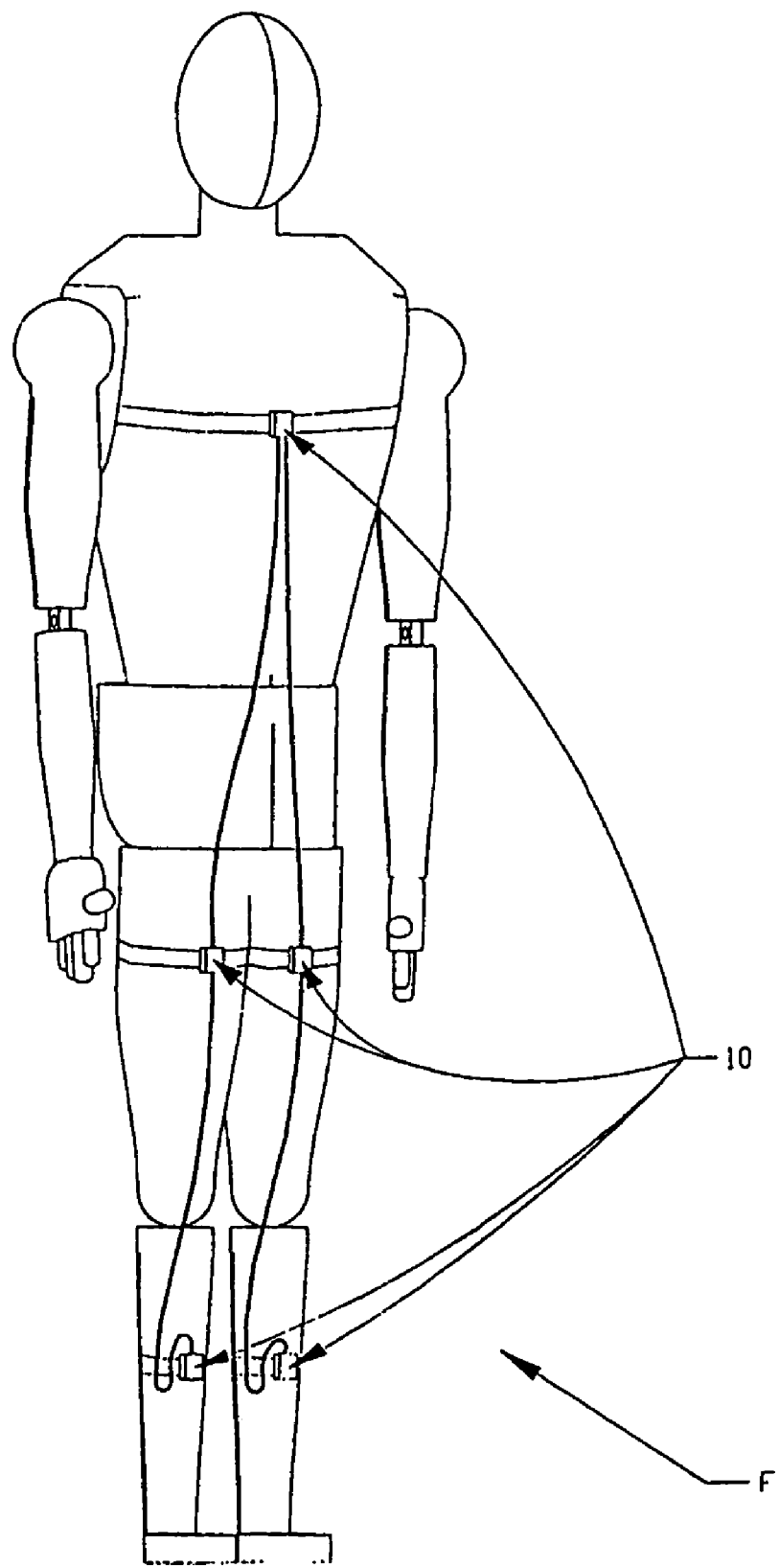
FIG. 5 is a perspective view of a plurality of solid state orientation sensors positioned on the human torso.

It is also desirable to increase the range of the device to measure orientations over 360 degrees on all axes. This can be accomplished by using the accelerometers to measure angular position relative to gravity and than determining which sensors to use to calculate angle over the maximum possible range. For example, in normal mode (FIG. 1) the device will measure 360 degrees around the Z axis (Yaw), 360 degrees around the Y axis (Pitch) and +/−70 degrees around the X axis (Roll). However, if the device is positioned as in FIG. 3, it is out of range (because roll has exceeded +/−70 degrees) unless we redefine the axes convention that is used in the above equations. If we redefine our axes convention, than the device can be used in the orientation shown in FIG. 4. Note that in FIG. 4 we have redefined our axes.

Figure 1:
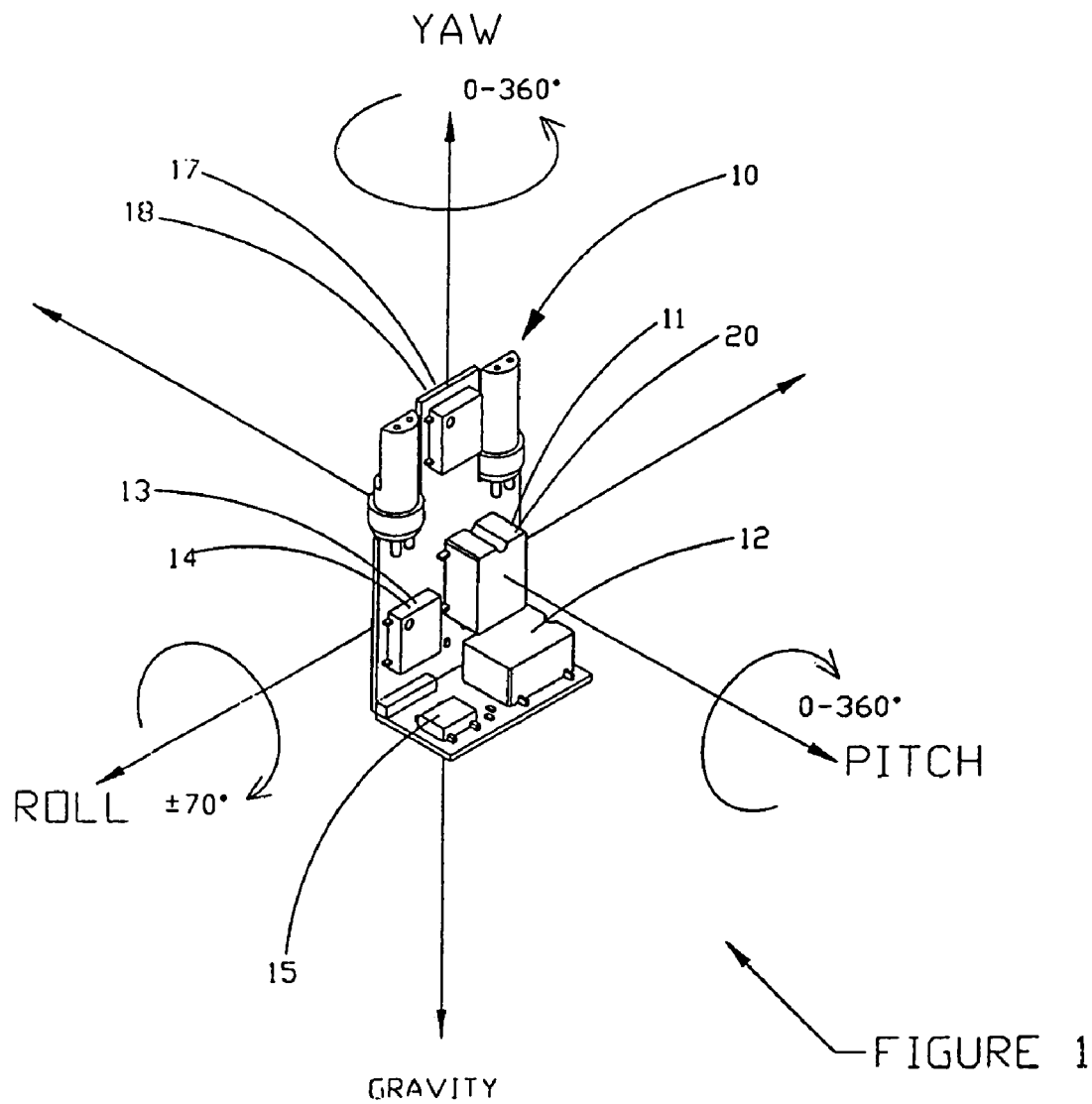
FIG. 1 is a perspective view of the solid state orientation sensor.

With reference to FIGS. 1 and 2, the first embodiment of solid state orientation sensor 10 includes three linear accelerometers (x 20, y 11, z 12) oriented with their sensitive measuring axes located at ninety degrees relative to each other. Solid state orientation sensor 10 has protective housing 21 for protecting the circuitry. Three magnetic sensors (x 13, y 14, z 15) are also included and arranged such that their sensitive measuring axes are oriented at ninety degrees relative to each other. Optional temperature sensor 16 can be used for temperature compensation of the magnetic and acceleration sensors, if required. The outputs of each sensor are amplified and filtered by anti-aliasing filters prior to being routed to analog to digital (A/D) converter 17. The digital data from the A/D converter is then scaled by offsets and scale factors for each sensor by the microprocessor or digital signal processor 18. The microprocessor than calculates the three orientation angles from the sensor data, as described herein. Once the angles are calculated the output of the system is provided in analog (via a d/a converter), and/or digital unit 19 (such as RS232, RS485, Controller Area Network or Transistor Transistor Logic). Digital networking allows for multiple devices to be wired together on a single bus, which is useful for applications such as posture monitoring.

While the disclosed methods and systems have been shown and described in connection with specific embodiments thereof, it is clearly to be understood that this is done only by way of example and not as a limitation to the scope of the invention as set forth in the appended claims.

We claim:

1. A solid state inclinometer sensor system, comprising a digital network of devices, wherein each device of said network includes a solid state inclinometer attached to a mounting structure, wherein said inclinometer includes gravity sensors and a processor, wherein said gravity sensors are mounted to provide components of earth's gravity, wherein said processor uses data derived from said gravity sensors to calculate inclination of said mounting structure and provide a digital output for transmission on said digital network.

2. A solid state inclinometer sensor system as recited in claim 1, further comprising analog filtering.

3. A solid state inclinometer sensor system as-recited in claim 1, further comprising digital filtering.

4. A solid state inclinometer sensor system, as recited in claim 3, wherein said filter comprises a programmable infinite impulse response filter.

5. A solid state inclinometer sensor system as recited in claim 3, further comprising two digital filters with different cutoff frequencies.

6. A solid state inclinometer sensor system as recited in claim 5, wherein said processor is connected for monitoring output of said digital filters and for determining which digital filter to apply.

7. A solid state inclinometer sensor system as recited in claim 3, wherein said digital filter includes a programmable digital filter, wherein a parameter of said digital filter is set by a characteristic of data coming from said gravity sensors.

8. A solid state inclinometer sensor system as recited in claim 1, wherein each said device further comprises a plurality of magnetic field sensors connected so data derived from said magnetic field sensors is processed in said processor.

9. A solid state inclinometer sensor system, as recited in claim 8, wherein said magnetic field sensors comprise solid state devices.

10. A solid state inclinometer sensor system as recited in claim 8, wherein said solid state inclinometer and said magnetic field sensors provide a sourceless orientation sensor.

11. A solid state inclinometer sensor system, as recited in claim 9, wherein said sourceless orientation sensor is capable of providing compass heading angle over a 360 degree range.

12. A solid state inclinometer sensor system as recited in claim 9, wherein said processor uses data derived from said gravity sensors and from said magnetic field sensors to calculate orientation of said mounting structure and provide a digital output for transmission on said digital network.

13. A solid state inclinometer sensor system as recited in claim 12, wherein said gravity sensors include three orthogonal accelerometers and wherein said plurality of magnetic field sensors include three orthogonal magnetometers.

14. A solid state inclinometer sensor system as recited in claim 12, wherein said digital network includes a first device and a second device, wherein said first device and said second device provide data for determining an angle there between.

15. A solid state inclinometer sensor system as recited in claim 14, wherein said first device and said second device provide data for determining a dynamically changing measurement of an angle there between.

16. A solid state inclinometer sensor system as recited in claim 14, wherein said network includes multiple devices for providing posture monitoring.

17. A solid state inclinometer sensor system, as recited in claim 8, wherein said processor comprises means for scaling data from at least one from the group consisting of said inclinometer and said magnetometers with calibration coefficients.

18. A solid state inclinometer sensor system as recited in claim 8, wherein said processor uses data derived from said magnetic field sensors to calculate compass heading.

19. A solid state inclinometer sensor system as recited in claim 8, wherein said magnetic field sensors provide outputs, further comprising amplification for said outputs.

20. A solid state inclinometer sensor system as recited in claim 8, further wherein said processor uses information from said accelerometers to project data from said magnetic field sensors onto a horizontal earth-referenced plane.

21. A solid state inclinometer sensor system as recited in claim 1, wherein said gravity sensors are orthogonally mounted.

22. A solid state inclinometer sensor system as recited in claim 1, wherein said processor uses quadrant checking for said inclination calculation.

23. A solid state inclinometer sensor system as recited in claim 1, wherein said processor uses acceleration from said gravity sensors to determine roll over a +/−70 degree range.

24. A solid state inclinometer sensor system, as recited in claim 1, wherein said processor comprises at least one from the group consisting of a microprocessor, a digital signal processor, and a microcontroller.

25. A solid state inclinometer sensor system, as recited in claim 1, wherein said inclinometer is capable of providing pitch over a 360 degree range.

26. A solid state inclinometer sensor system, as recited in claim 25, wherein said gravity sensors include a plurality of accelerometers, wherein said inclinometer uses signs of acceleration calculated from two of said accelerometers to provide said pitch over said 360 degree range.

27. A solid state inclinometer sensor system as recited in claim 1, wherein said gravity sensors include three orthogonal accelerometers.

28. A solid state inclinometer sensor system, as recited in claim 27, wherein said processor uses acceleration from said accelerometers to determine roll over a +/−70 degree range.

29. A solid state inclinometer sensor system, as recited in claim 27, wherein said processor uses acceleration from said accelerometers to determine roll over a +/−90 degree range.

30. A solid state inclinometer sensor system, as recited in claim 1, wherein said mounting structure comprises a board, wherein said processor and said gravity sensors are all located on said board.

31. A solid state inclinometer sensor system, as recited in claim 1, wherein said mounting structure further comprises an analog signal conditioning unit, a digital signal conditioning unit, a rate responsive adaptive filter, an analog to digital converter, a temperature sensor, a digital to analog converter, and a network connector.

32. A solid state inclinometer sensor system, as recited in claim 1, wherein said mounting structure further comprises an adaptive filter.

33. A solid state inclinometer sensor system, as recited in claim 1, wherein said mounting structure further comprises an analog low pass filter to minimize effect of inertial inputs.

34. A solid state inclinometer sensor system, as recited in claim 1, wherein said mounting structure further comprises a low pass digital filter.

35. A solid state inclinometer sensor system, as recited in claim 1, wherein said mounting structure further comprises a user programmable digital filter.

36. A solid state inclinometer sensor system, as recited in claim 35, wherein said digital filter has a variable filter cutoff and wherein said filter cutoff is programmable.

37. A solid state inclinometer sensor system, as recited in claim 35, wherein said filter cutoff is set by a derivative of data from said magnetic field sensors.

38. A solid state inclinometer sensor system, as recited in claim 37, wherein said filter cutoff is set by a first derivative of said data.

39. A solid state inclinometer sensor system, as recited in claim 38, wherein said filter cutoff is programmed to increase when said first derivative of magnetometer data is small and to decrease when said first derivative of magnetic field sensor data is large.

40. A solid state inclinometer sensor system, as recited in claim 36, wherein said programmable filter can be set to provide greater filtering and lesser filtering depending on movement of the mounting structure.

41. A solid state inclinometer sensor system, as recited in claim 1, further comprising connectors for external communication.

42. A solid state inclinometer sensor system, as recited in claim 41, wherein said connectors are connected to said digital network.

43. A solid state inclinometer sensor system as recited in claim 1, wherein said digital network of devices are wired together on a single bus.

44. A solid state inclinometer sensor system as recited in claim 1, wherein said network includes a first device and a second device for providing measurement of an angle there between.

45. A solid state inclinometer sensor system as recited in claim 44, wherein said network includes said first device and said second device for providing a dynamically changing measurement of an angle there between.

* * * * *